(12) United States Patent
Kuroda et al.

(10) Patent No.: US 6,608,148 B1
(45) Date of Patent: Aug. 19, 2003

(54) HOT MELT ADHESIVE OF CATIONIC POLYMERIZABLE COMPOUND, PHOTOINITIATOR AND PHTHALATE DIESTER

(75) Inventors: Takeo Kuroda, Osaka (JP); Tsuyoshi Hasegawa, Hasuda (JP); Masanori Matsuda, Shiga (JP); Takeshi Miyake, Shiga (JP); Takashi Shinjo, Osaka (JP)

(73) Assignee: Sekisui Chemical Company, Ltd., Osaka (JP)

( * ) Notice: Subject to any disclaimer, the term of this patent is extended or adjusted under 35 U.S.C. 154(b) by 26 days.

(21) Appl. No.: 09/868,618

(22) PCT Filed: Oct. 24, 2000

(86) PCT No.: PCT/JP00/07414

§ 371 (c)(1),
(2), (4) Date: Jun. 22, 2001

(87) PCT Pub. No.: WO01/30934

PCT Pub. Date: May 3, 2001

(30) Foreign Application Priority Data

Oct. 27, 1999 (JP) .............................. 11-305866
Apr. 5, 2000 (JP) ........................ 2000-103638
Aug. 29, 2000 (JP) ........................ 2000-259610

(51) Int. Cl.$^7$ .................. C08L 63/02; C08L 71/02; C09J 163/02; C09J 173/02
(52) U.S. Cl. ............. 525/533; 252/182.23; 252/183.11; 525/411
(58) Field of Search ............ 523/456; 252/182.23, 252/183.11; 525/411, 533

(56) References Cited

U.S. PATENT DOCUMENTS 4,243,706 A * 1/1981 Williams .................. 427/386
6,265,460 B1 * 7/2001 Kawate et al. ................ 522/31

FOREIGN PATENT DOCUMENTS

| EP | 0620259 A | 10/1994 |
| JP | 52-959 A | * 1/1977 |
| JP | 60-51770 A | * 3/1985 |
| JP | 2-233745 A | * 9/1990 |
| JP | 7-26234 A | * 1/1995 |
| JP | 8-60128 A | * 3/1996 |
| JP | 10-17843 A | * 7/1996 |
| JP | 11-140414 A | * 5/1999 |
| JP | 11-279515 A | * 10/1999 |

OTHER PUBLICATIONS

Dewent abstract accession No. 1995–102144 for Japanese Patent No. 7–26234, Yokohama Rubber Company, Limited, Jan. 27, 1995.*
Patent Abstracts of Japan, JP 59–105037A (Shin Nippon Rika KK), 6/84.
Database Chemabs, Miayake Takeshi: "Reactive hot–melt adhesive compositions with good heat and moisture resistance", XP002222301 & JP 2001–098242 ( (Sekisui Chemical Co), 9/99.

* cited by examiner

Primary Examiner—Robert E. L. Sellers
(74) Attorney, Agent, or Firm—Townsend & Banta

(57) ABSTRACT

The invention is a reactive hot melt adhesive composition comprising a cationically polymerizable compound, on the average per molecule, having one or more cyclic ether groups such as epoxy groups, a phthalate diester compound expressed by the following formula (2) and a cationic photo-initiator:

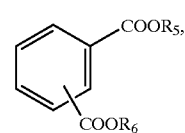

(2)

wherein in the formula (2), $R_5$ indicates $(C_h H_{2h} O)_i H$ and $R_6$ indicates $(C_k H_{2k} O)_l H$ or $(C_k H_{2k} O)_l C_k H_{2k+1}$, provided that h, i, k and l each are an integer of 1 or more. The present invention provides a reactive hot melt adhesive, in which a curing reaction progresses under application of actinic radiation.

2 Claims, No Drawings

HOT MELT ADHESIVE OF CATIONIC POLYMERIZABLE COMPOUND, PHOTOINITIATOR AND PHTHALATE DIESTER

FIELD OF THE INVENTION

The present invention relates to reactive hot melt adhesive compositions applied by hot melt coating and cured by application of actinic radiation.

BACKGROUND OF THE INVENTION

In the fields of bookbinding, packing, textile processing, electronics, transportation and so on, hot melt adhesives have been known as adhesives widely utilized for adhesion of paper, fibers, wood, glass, plastics, metal and others.

A hot melt adhesive is, when being actually used, hot melted in an applicator normally at temperature of the order ranging from 100 to 200° C.

The hot melt adhesive coated on an article is cooled and solidified to make the article to adhere.

Such a hot melt adhesive normally has a very short time of one minute or less to reveal a adhesion strength after articles are bonded together. Hence, an adhesion operation can be completed in a short time.

However, a hot melt adhesive is required to be melted by heating; therefore, the adhesive generally has a weak point of poor heat resistance.

Therefore, studies have been widely conducted in order to improve heat resistance through introduction of a curing mechanism based on a chemical reaction into a coating/ adhering operation of a hot melt adhesive.

For example, a hot melt adhesive of a moisture-initiating curing type is disclosed in JP-A-74-98445.

Since a curing reaction progresses in this hot melt adhesive by moisture in the air, storage stability is poor and the curing reaction is slow, and a problem is further pointed out and working environments are adversely affected by the presence of the adhesive since the adhesive contains isocyanate based material, which results in insufficient curing when the adhesive is applied to moistureproof materials.

Then, a hot melt composition, excellent in heat resistance, and composed of an epoxy compound and a polyester compound together with a photo-initiator is disclosed as a reactive hot melt composition of a non-moisture-initiating curing type in JPA-94-306346.

On the other hand, replacement of vinyl chloride resin has been rapidly advanced from the viewpoint of an environmental problem in recent years.

For example, studies have been conducted on replacement of an PVC film with a polyester film (PET) on a great scale.

However, since PET is generally an article of poor adhesiveness, the hot melt composition disclosed in JP-A-94-306346 has had a problem since no sufficient adhesion strength is obtained when PET is used as an article to which the hot melt composition is applied.

In light of the above described problems, it is an object of the present invention to provide a reactive hot melt adhesive, in which a curing reaction progresses under application of actinic radiation, and excellent in not only heat resistance but also adhesiveness to PET.

DISCLOSURE OF THE INVENTION

1. The first aspect of the invention is a reactive hot melt adhesive composition comprising: a cationically polymerizable compound, on the average per molecule, having one or more cationically polymerizable reactive groups of a structure of the following formula (1); a phthalate diester compound of a structure of the following formula (2); and a cationic photo-initiator:

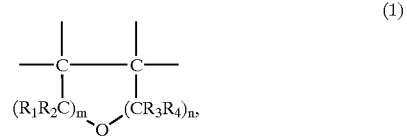

where in the formula (1), $R_1$, $R_2$, $R_3$ and $R_4$ each indicate a hydrogen atom, a methyl group, an ethyl group, an isopropyl group, an isoamyl group or a phenyl group, provided that m and n each are an integer having a value of 0, 1 or 2, and

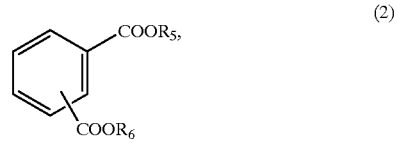

wherein in the formula (2O), $R_5$ indicates $(C_hH_{2h})_iH$ and $R_6$ indicates $(C_kH_{2k}O)_1$ H or $(C_kH_{2k}O)_1C_kH_{2k+1}$, provided that h, i, k and l each are an integer having a value of 1 or more 2. The second aspect of the invention is a reactive hot melt adhesive composition comprising: a cationically polymerizable compound, on the average per molecule, having one or more cationically polymerizable reactive groups of a structure of the following formula (1); a phthalate diester compound of a structure of the following formula (3); and a cationic photo-initiator:

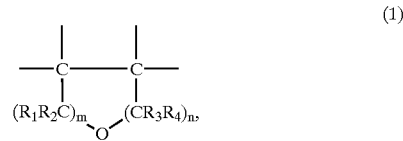

where in the formula (1), $R_1$, $R_2$, $R_3$ and $R_4$ each indicate a hydrogen atom, a methyl group, an ethyl group, an isopropyl group, an isoamyl group or a phenyl group, provided that m and n each are an integer having a value of 0, 1 or 2,

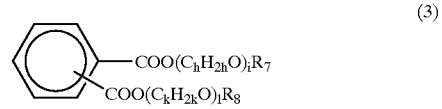

wherein in the formula (3), $R_7$ indicates a cationically polymerizable group of a structure of the following formula (4), $R_8$ indicates a cationically polymerizable group of a structure of the following formula (4), H or an alkyl group, provided that h and k each are an integer having a value of 1 or more and i and 1 each are an integer having a value of 0 and 1 or more, and

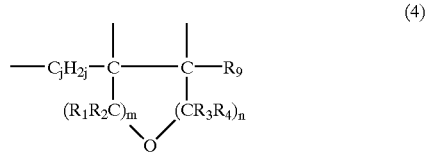

(4)

wherein in the formula (4), $R_1$, $R_2$, $R_3$ and $R_4$ each indicate a hydrogen atom, a methyl group, an ethyl group, an isopropyl group, an isoamyl group, or a phenyl group and $R_9$ indicates an alkyl group or a hydrogen atom, provided that j is an integer having a value of 0 and 1 or more and m and n each are an integer having a value of 0, 1 or 2.

The first and second aspects of the invention can further comprise a thermoplastic resin. Furthermore, the cationically polymerizable reactive group of the cationically polymerizable compound can be an epoxy group.

THE BEST MODES OF THE EMBODIMENTS

A cationically polymerizable compound used in the present invention (the invention according to claim 1) is not limited specifically but may be any of compounds as long as each of them is a compound, on the average/per molecule, having one or more cationically polymerizable reactive groups of a structure of the above described formula (1).

The cationically polymerizable compound may be a monomer, an oligomer, or a polymer, and may includes a constituent atom such as a carbon atom, a hydrogen atom, an oxygen atom, a nitrogen atom, a sulfur atom and a phosphorous atom. The cationically polymerizable reactive group may be either a terminal group or a side-branched group of a molecule, or may reside in the molecule and further, has no limitation on a structure and a molecular weight.

A cationically polymerizable compound itself may be a hot melt resin. Besides, the cationically polymerizable compound may be a liquid at a normal temperature, in which case, a liquid cationically polymerizable compound and a solid thermoplastic resin are blended and provided as a solid composition.

As such cationically polymerizable compounds, preferably named are, for example, cyclic ether compounds such as an epoxy compound, an oxetane compound and an oxolane compound.

Among them, the epoxy compound is preferably used because of its excellent cationically polymerizing properties.

Furthermore, among epoxy compounds, a bisphenol based epoxy resin is preferred because of a high degree of improvement on adhesiveness and to be concrete, there can be named a bisphenol A type, bisphenol⇌F type, a bisphenol⇌S type and a bisphenol⇌AD type.

Among them, a bispenol⇌F epoxy resin is especially preferably used because of excellency in adhesiveness to PET.

Cationically polymerizable compounds may be used in combinations comprising two or more kinds.

Thermoplastic resins used in the present invention may be any of resins as long as they are melted by heating and solidified by cooling, which are:

for example, polyolefins resin such as polyethylene and polypropylene; elastomer resins such as polybutadiene, polychloroprene, polyisoprene, styrene-butadiene copolymer and acrylonitrile-butadiene copolymer; polyether resins such as polyethylene oxide, polypropylene oxide and polytetramethylene oxide; polyvinyl based resins such as polyvinyl acetate, ethylene-vinyl acetate copolymer, polyvinyl chloride, ethylene-vinyl chloride copolymer, polyvinylidene chloride, polyvinyl alcohol, ethylene-vinyl alcohol copolymer, polyvinyl formal, polyvinyl butyral, and polyvinyl ether; (meta) acryl copolymer resin, styrol resin, polyester resin, polycarbonate resin, ketone resin, acrylonitril-stylene copolymer resin and acrylonitril-butadiene-stylene copolymer resin.

Among the above described resins, resins assuming a solid state at 20° C. are preferably used since heat resistance of adhesives after cationic photopolymerization is achieved with ease.

To be concrete, preferably used are polyvinyl based resin, (meta)acryl copolymer, polyester resin, and polycarbonate.

The resins may be used either singly or in combination of two or more kinds.

A ratio of a thermoplastic resin to a cationically polymerizable compound above described is preferably in the range of from 95/5 to 5/95 in weight and especially preferable in the range of from 10/90 to 80/20 in weight.

As phthalate diesters in the invention according to claim 1, compounds each having a structure expressed by the above described formula (2).

The compounds are obtained by a condensation reaction between a carboxyl group of a phthalic acid and hydroxyl groups of alcohol and/or glycol, and an ester exchange reaction between phthalate ester, and alcohol and/or glycol.

In such a fashion, by using a compound having a structure analogous to PET as a part of a composition, affinity with PET increases, thereby enabling achievement of a high adhesion strength. Furthermore, by having a hydroxyl group in at least one of ester portions, a reaction with a cationically polymerizable compound becomes possible to achieve high heat resistance.

Phthalate diesters may be used either singly or in combination of two or more kinds.

As phthalate diester according to claim 2, used is a compound having a structure expressed by the above described formula (3).

The phthalate diester is obtained by a condensation reaction between a carboxylic group of phthalic acid and alcohol having a cationically polymerizable reactive group, or by a procedure in which a carboxylic group of phthalic acid and hydroxyl group of glycol are subjected to a condensation and thereafter, a reaction product from the condensation reaction is further reacted with a halogenated compound having a cationically polymerizable reactive group.

In such a fashion, by using a compound having a structure analogous to PET as a part of a composition, affinity with PET increases, thereby enabling achievement of high adhesiveness.

Furthermore, since a cationically polymerizable reactive group is present in at least a part of ester portions, a reaction with a cationically polymerizable compound becomes possible to achieve high heat resistance.

Phthalate diesters in the invention according to claim 2 may be used either singly or in combination of two or more kinds.

An amount of the phthalate ester is preferably in the range of from 1 to 50 parts by weight and especially preferably in the range of from 1 to 40 parts by weight, based on 100 parts by weight of a cationically polymerizable compound.

When the amount is less than 1 part by weight, adhesiveness to PET is insufficient and to the contrary, when the amount exceeds 50 parts by weight, heat resistance decreases.

Note that in a case where thermoplastic resin is contained, an amount of the resin is preferably in the range of from 1 to 50 parts by weight and especially preferable in the range of from 1 to 40 parts by weight, based on 100 parts by weight of a cationically polymerizable compound and the thermoplastic resin combined.

As a cationic photo-initiator described above, there is no specific limitation on the compound, but any of compounds may be used as far as the compounds can produce a cation for initiating polymerization of a cationically polymerizable compound.

To be concrete, named are aromatic iodonium complex salt, aromatic sulfonium complex salt, metallocene salt, arylsilanol aluminum complex and others.

As examples of the cationic photo-initiator, in U.S. Pat. No. 4,256,828 disclosed are an aromatic iodonium complex salt and an aromatic sulfonium complex salt.

In addition, a metallocene salt is disclosed in U.S. Pat. No. 5,089,536.

By using the cationic photo-initiators under irradiation with light of a wavelength comprising 200 to 400 nm, curing can be accelerated to achieve excellent, highly heat-resistant adhesiveness.

Moreover, since no curing reaction arises when a composition is screened from actinic radiation, the composition can be an adhesive excellent in storage stabilization.

An amount of a cationic photo-initiator to be loaded is different according to a kind and intensity of actinic radiation, a kind and amount of a cationically polymerizable compound, a kind of a cationic photo initiator and others.

The amount of a cationic photo-initiator is preferably in the range of from 0.01 to 10 parts by weight based on 100 parts by weight of a cationically polymerizable compound.

It is an indispensable condition for a reactive hot melt adhesive composition that a composition obtained by blending a cationically polymerizable compound, a thermoplastic resin a phthalate diester compound, and a cationic photo-initiator to be homogeneously dispersed is a solid at 20° C.

Note that the term "solid" used herein means to include a solid having tackiness at a ordinally temperature (20° C.).

Moreover, into a reactive hot melt adhesive composition described above, according to a need, components can also be added, which are: an adhesiveness modifier such as a silane coupling agent, a titanium coupling agent; a sensitizer, a dehydrating agent, an anti-aging agent, a stabilizing agent, a plasticizer, wax, filler, a fire retardant, a blowing agent, an antistatic agent, a fungistat, a viscosity modifier and others.

Components which can be added are not limited to the above described components.

Furthermore the above described components may be added in combination of two or more kinds.

Still furthermore, the above components may be added, prior to formation of a composition, to the main components described previously, comprising a cationically polymerizable compound, a phthalate diester, a cationic photo-initiator and a thermoplastic resin, or after the formation of a composition.

A production method for a reactive hot melt adhesive composition of the present invention may be any of methods as far as components to be loaded are blended to be dispersed into homogeneity. However, it is necessary for production thereof to be performed in a proper heating condition in which materials to be used can be molten.

Furthermore, it is allowed that blending and dispersion of the components in production are conducted in a solvent free condition, or alternatively, the blending and dispersion are conducted in an inactive solvent, followed by removal of the solvent.

As kneading facilities, while, to be concrete, there can be named: a double helical ribbon bath, a gate bath, a butterfly mixer, a planetary mixer, a three-roll mill, a kneader-extruder apparatus, an extruder type kneader, the kneading facilities are not limited to those.

Any of the above described methods is preferably performed in a water-free condition in order to reduce mixing of water into a composition, which water is a component to impair cationic polymerization.

Furthermore, any of the above described methods is performed under a reduced pressure lower than an atmospheric pressure and if necessary, under an increased pressure higher than an atmospheric pressure.

Still furthermore, in any case of production methods for an adhesive, a production is preferably performed in a condition in which a facility is substantially screened from actinic radiation at an energy level effective for starting curing.

Yet furthermore, heating temperature in production is preferably in the range of from 50 to 250° C. and more preferably in the range of from 80 to 200° C.

Moreover, two or more of the methods may be combined.

Compositions produced in such ways may have tackiness or non-tackiness.

In the above described hot melt adhesive composition, a reaction is progressed by actinic radiation; therefore, while a method for storage thereof is not limited specifically, any of methods available can be adopted as far as they screens the composition from the actinic radiation at an energy level effective for starting curing.

As preferable storage vessels, vessels opaque to actinic radiation at an energy level effective for starting curing are named: for example, a pail, a can, a drum, a cartridge, a mold; release box, a mold release tray, a corrugated box, a paper bag, a plastic box or bag and others, but there is no specific limitation to those named here.

Furthermore, materials of the vessels are not specifically limited.

Still furthermore, a composition in the present invention may be used immediately after production without storage for any period of time by means of one of such storage methods.

Any of methods can be used for adhesion between articles with the above described hot melt adhesive composition, without any limitation.

For example, a method is presented, in which a reactive hot melt adhesive composition is heated and melted, applied on one or both of articles in a molten state of the composition, then a reactive hot melt adhesive composition coating on one or both of the articles are irradiated with actinic radiation and the articles are stacked on each other; and thereafter the articles are further pressed toward each other or pressed toward each other under heating, thereby completing adhesion, and another method is presented, in which a film of a reactive hot melt adhesive composition is prepared from a molten state thereof created by heating using a roll coater, a flow coater, a bar coater, a hot melt surface coater, an extruder or the like; the film of a reactive hot melt adhesive composition is irradiated with actinic radiation; articles are stacked on each other with the irradiated film interposing therebetween; and thereafter the articles are further pressed toward each other or pressed toward each other under heating, thereby completing adhesion.

Still another method can be used, in which articles transparent to actinic radiation are used. In this method, the articles are stacked on each other with a reactive hot melt adhesive composition interposed therebetween, or pressed each other. Thereafter, the composition is irradiated with the actinic radiation through one or both of the articles, thereby completing adhesion.

As methods for hot melt coating a composition on an article, the following are unlimitedly named:
   a method in which the composition in a molten state created by hot melting is applied on an article with a normal hot melt applicator, a hot melt coater or the like;
   a method in which an article is immersed in the composition in a molten state created by hot melting;
   a method in which the composition in a molten state created by hot melting is sprayed onto an article; and
   a method in which the composition in a molten state created by hot melting is forced out onto an article by an extruder or the like.

Furthermore, the composition is supplied to the above described hot melt applicators using the following means in the following forms of the composition: The composition may be sent to a hot melt applicator using a pail unloader, a cartridge dispenser or the like in the form of sticks, pellets, slugs, blocks, pillows, billets or the like.

Furthermore, the composition may be hot melted in its entirety or in the vicinity of a heater.

Still furthermore, in a case of any of methods for hot melt coating, it is necessary for the method to be performed in a condition where actinic radiation at an energy level effective for starting curing is screened off.

As actinic radiation employed in the present invention, any kind thereof may be selected as far as a cation is produced from the above described cationic initiators.

A kind of actinic radiation is properly selected according to a kind of a cationic initiator and preferably ultraviolet light is used, in which 200 to 600 nm in wavelength is preferably used and particularly, light comprising a wavelength of 200 to 400 nm is desirable when as a cationic photo-initiator, an aromatic iodonium complex salt, an aromatic sulfonium complex salt, a metallcene salt or the like is employed.

An irradiation method with actinic radiation is not specifically limited, but may be any of methods as far as they can irradiate an articles directly or an article, transparent or translucent, through the article, with the actinic radiation to an effective energy amount.

An irradiation dosage of actinic radiation is desirably in the range of from 0.001 J to 10 J, although the dosage cannot be strictly defined since the dosage is different according to a kind of a cationic photo-initiator and a thickness and amount of a reactive hot melt adhesive composition in a portion on which the composition is coated.

Since a reactive hot melt adhesive composition is cured under irradiation with a low energy level, the dosage of 60 mJ or more is sufficient in a case of a thickness of the order of 200 $\mu$m.

As an radiation source, in a case where ultra violet light is adopted, exemplified are a low pressure mercury lamp, a medium pressure mercury lamp, a high pressure mercury lamp, an extra-high pressure mercury lamp, a chemical lamp, a black light lamp, a microwave-exciting mercury lamp, a metal halide lamp, a sodium lamp, a fluorescent lamp or the like.

In addition, natural light may also be used.

When a composition of the present invention is desired to be sufficiently cured in a shorter period under irradiation with actinic radiation, proper heating can also be additionally applied during or after irradiation with the actinic radiation.

A heating method in this case has only to be a most preferable one selected properly in consideration of a kind of a composition, a shape and nature of an article, heating conditions and the like.

For example, while exemplified are such as blowing a warm air, placing in a heated oven and heating with a heater, the heating method is not limited to one of the examples.

Furthermore, the exemplified heating methods may be used in combination of two or more kinds.

As articles to be pasted together using a reactive hot melt adhesive composition of the present invention, PET (polyethylene terephthalate) is named as a preferable one.

In addition to PET, exemplified are metals (iron, aluminum and others) and alloys thereof; plastics other than PET and blends thereof; inorganic materials (glass, concrete, stone, mortar, ceramics and others); cellulose materials (wood, paper and others), leather and so on, to which no limitation is applied.

Furthermore, articles of the above described materials may assume various forms, such as a plate, a block, a rod, a sheet, a cord, fibers, a honey comb, a pipe, particles and others of different shapes. Still further, the composition may be used for combinations of different articles, to be pasted together, selected from the group consisting of the articles described above.

A composition of the present invention can be used as an elastic adhesive, a structural adhesive, a pressure sensitive adhesive, a sealing compound or the like utilizing a nature of the reactive hot melt adhesive.

As especially preferable applications, named are applications in which PET is used as an article to which adhesion is performed, such as adhesion between cards and the like made from a PET film and adhesion of a PET molded piece.

As additional applications, preferably exemplified are adhesion between a core layer and a top layer of a sandwich panel which is used for panels of a door panel, a partition, a shutter, furniture, a black board, a white board, office equipment, a housing panel and so on; and adhesion between a core layer and a top layer for furniture, a partition, a door panel and a ceiling material for an automobile interior finish and others, however, to which no limitation is applied.

(Action)

Since a reactive hot melt adhesive composition of the present invention is melted and softened by heating, the composition can be applied to an article similar to a normal hot melt adhesive.

Besides, since a cationically polymerizable reactive group of a cationically polymerizable compound are subjected to a reaction under irradiation with actinic radiation, coating on an article or forming into a film and pasting articles on each other using the coating or the film at a relative low temperature can be compatible with high heat resistance after curing.

Moreover, by using a phthalate diester compound having a specific structure analogous to PET, it becomes possible to achieve high adhesiveness to PET.

EXAMPLES

Below, description will be given of the present invention showing non-limitative examples of the present invention.

Example 1

Preparation of a Composition

A composition composed of bisphenol⇌F epoxy resin (made by Yuka Shell Epoxy K.K., trade name: Epikote 4007P): 70 parts by weight diethyleneglycol o-phthalate diester (or called bis(β-(2-hydroxyethoxy)ethyl)o-phthalate, made by Dai Nippon Ink & Chemicals, Inc., trade name: Spinodol RD-3150P): 30 parts by weight, and cationic photo-initiator (made by UCC, trade name: UVI-6990): 1 part by weight was kneaded at 150° C. in a planetary mixer with a jacket though which heated oil can be circulated to obtain a reactive hot melt adhesive composition.
[Manufacture of a Composite Sheet]

The reactive hot melt adhesive composition obtained in the above described way was applied on a first white PET sheet of 0.1 mm in thickness (made by Toray Industries, Inc., trade name: lumilar-E20) at 120° C., thereafter, the composition coating was irradiated with ultra violet light from extra-high pressure mercury lamp at an energy dosage of 1500 mJ/cm$^2$ and then, a second white PET sheet on which no reactive hot melt adhesive composition was applied was stacked on the first white PET sheet, followed by hot lamination at 70° C. to obtain a composite sheet.

Example 2

Preparation of a Composition

A composition composed of bisphenol⇋F epoxy resin (made by Yuka Shell Epoxy K.K., trade name: Epikote 4007P): 75 parts by weight diglycidyl phthalate ester (made by Nagase Kasei K.K., trade name: Denacol EX-721): 25 parts by weight, and cationic photo-initiator (made by UCC, trade name: UVI-6990): 1 part by weight was kneaded at 150° C. in a planetary mixer with a jacket though which heated oil can be circulated to obtain a reactive hot melt adhesive composition.
[Manufacture of a Composite Sheet]

A composite sheet was obtained by a method similar to Example 1.

Example 3

Preparation of a Composition

A composition composed of bisphenol⇋A epoxy resin (made by Yuka Shell Epoxy K.K., trade name: Epikote 1001): 60 parts by weight polyester compound (a number average molecular weight of 25000, made by Toyo-bo K.K., trade name: Bilon 200) 25 parts by weight diethyleneglycol o-phthalate diester (made by Dai Nippon Ink & Chemicals, Inc., trade name: Spinodol RD-3150P): 15 parts by weight, and cationic photo-initiator (made by UCC, trade name: UVI-6990): 1 part by weight was kneaded at 150° C. in a planetary mixer with a jacket though which heated oil can be circulated to obtain a reactive hot melt adhesive composition.
[Manufacture of a Composite Sheet]

A composite sheet was obtained by a method similar to Example 1.

Example 4

A composition composed of bisphenol⇋A epoxy resin (made by Yuka Shell Epoxy K.K., trade name: Epikote 1001): 60 parts by weight, polyester compound (a number average molecular weight of 25000, made by Toyo-bo K.K., trade name: Bilon 200): 25 parts by weight, diglycidyl phthalate ester (made by Nagase Kasei Kogyo K.K., trade name: Denacol EX-721): 15 parts by weight, and cationic photo-initiator (made by UCC, trade name: UVI-6990): 1 part by weight was kneaded at 150° C. in a planetary mixer with a jacket though which heated oil can be circulated to obtain a reactive hot melt adhesive composition.
[Manufacture of a Composite Sheet]

A composite sheet was obtained by a method similar to Example 1.

Comparative Example 1

Preparation of a Composition

A composition composed of bisphenol⇋F epoxy resin (made by Yuka Shell Epoxy K.K., trade name: Epikote 4007P): 100 parts by weight, and cationic photo-initiator (made by UCC, trade name: UVI-6990): 1 part by weight, was kneaded at 150° C. in a planetary mixer with a jacket though which heated oil can be circulated to obtain a reactive hot melt adhesive composition.
[Manufacture of a Composite Sheet]

A composite sheet was obtained by a method similar to Example 1 using the reactive hot melt adhesive composition obtained as described above.

Comparative Example 2

Preparation of a Composition

A composition composed of bisphenol⇋A epoxy resin (made by Yuka Shell Epoxy K.K., trade name: Epikote 1001): 80 parts by weight, polyester compound (a number average molecular weight of 25000, made by Toyo-bo K.K., trade name: Bilon 200): 20 parts by weight, and cationic photo-initiator (made by UCC, trade name: UVI-6990): 1 part by weight, was kneaded at 150° C. in a planetary mixer with a jacket though which heated oil can be circulated to obtain a reactive hot melt adhesive composition.
[Manufacture of a Composite Sheet]

A composite sheet was obtained by a method similar to Example 1 using the reactive hot melt adhesive composition obtained as described above.
[Evaluation]

The composite sheets obtained in Examples 1 to 4 and Comparative Examples 1 and 2 were evaluated in the following processes:
[Normal Condition Adhesiveness]

Composite sheets obtained in the examples and comparative examples were subjected to a T peel test using a tensile testing machine in conditions of temperature of 23° C. and a separation speed of 50 mm/min to measure an adhesion strength and observe a state of breakage.

An adhesion strength of a specimen was determined, when a PET sheet was broken, as a value at that time, or alternatively, when a PET sheet was not broken, as an average of measured values.
[Heat-Resistant Adhesiveness]

Composite sheets obtained in the examples and comparative examples were subjected to a T peel test using a tensile testing machine in conditions of temperature of 80° C. and a separation speed of 50 mm/min to measure an adhesion strength and observe a state of breakage.

An adhesion strength of a specimen was determined, when a PET: sheet was broken, as a value at that time, or alternatively, when a PET sheet was not broken, as an average of measured values.

TABLE 1

|  | normal condition adhesion force | | heat-resistant adhesion force | |
| --- | --- | --- | --- | --- |
|  | adhesion strength (N/m$^2$) | breakage state | adhesion strength (N/m$^2$) | breakage state |
| Example 1 | 1420 | sheet breakage | 1300 | sheet breakage |
| Example 2 | 1310 | sheet breakage | 1210 | sheet breakage |

TABLE 1-continued

| | normal condition adhesion force | | heat-resistant adhesion force | |
|---|---|---|---|---|
| | adhesion strength (N/m$^2$) | breakage state | adhesion strength (N/m$^2$) | breakage state |
| Example 3 | 1350 | sheet breakage | 1160 | sheet breakage |
| Example 4 | 1300 | sheet breakage | 1250 | sheet breakage |
| Comparative example 1 | 250 | interface breakage | 180 | interface breakage |
| Comparative example 2 | 750 | interface breakage | 570 | interface breakage |

INDUSTRIAL APPLICABILITY OF THE INVENTION

A reactive hot melt adhesive of thee present invention is composed of a cationically polymerizable compound, a phthalate diester compound having a specific structure, and a cationic photo-initiator; therefore, adhesiveness to PET, which has poor adhesive abilities, is excellent and a curing reaction progresses under irradiation with actinic radiation, which further makes the reactive hot melt adhesive excellent in heat resistance.

What is claimed is:

1. A reactive hot melt adhesive composition comprising:
   a cationically polymerizable compound, on the average per molecule, having one or more cationically polymerizable reactive groups of a structure of the following formula (1);
   a phthalate diester compound of a structure of the following formula (2); and
   a cationic photo-initiator;

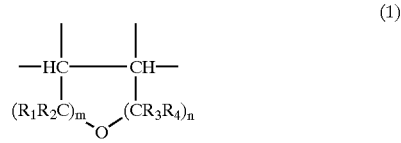
(1)

wherein, in the formula (1), $R_1$, $R_2$, $R_3$ and $R_4$ each indicate a hydrogen atom, a methyl group, and ethyl group, an isopropyl group, an isoamyl group or a phenyl group, provided that m and n each are an integer having a value of 0, 1 or 2, and

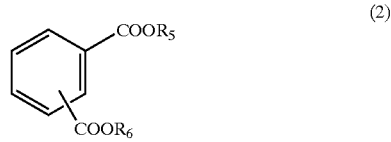
(2)

wherein, in the formula (2), $R_5$ indicates $(C_hH_{2h}O)_iH$ and $R_6$ indicates $(C_kH_{2k}O)_1C_kH_{2k+1}$, provided that h, I, k and l each are an integer having a value of 1 or more.

2. The reactive hot melt adhesive composition according to claim 1, wherein the cationically polymerizable reactive group of the cationically polymerizable compound is an epoxy group.

* * * * *